No. 771,230.  
Patented October 4, 1904.

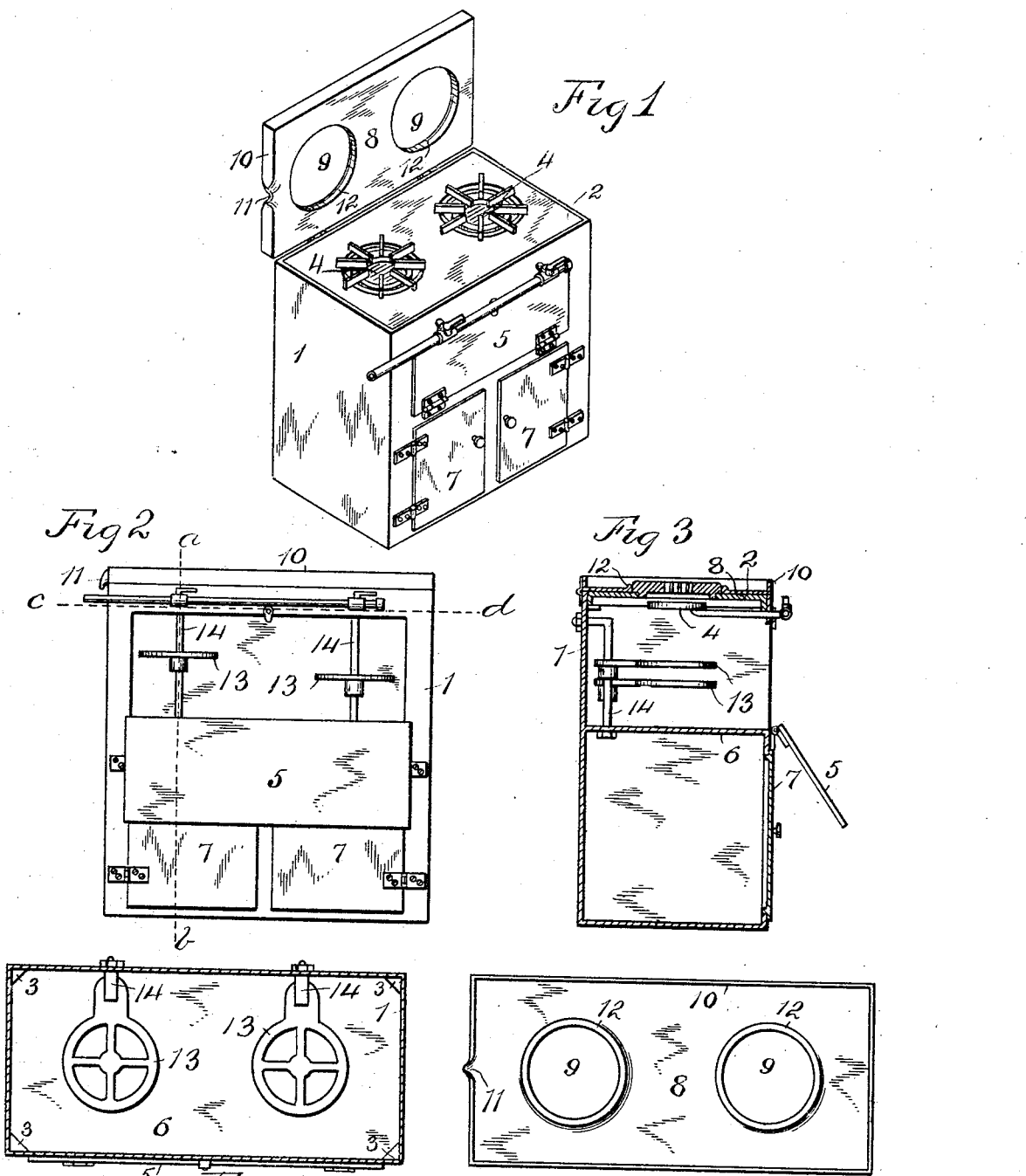

UNITED STATES PATENT OFFICE.

LUCY A. BURNHAM, OF KANSAS CITY, MISSOURI.

WARMING-OVEN FOR GAS OR VAPOR STOVES.

SPECIFICATION forming part of Letters Patent No. 771,230, dated October 4, 1904.

Application filed January 4, 1904. Serial No. 187,639. (No model.)

*To all whom it may concern:*

Be it known that I, LUCY A. BURNHAM, a citizen of the United States, residing at Kansas City, in the county of Jackson and State of Missouri, have invented a certain new and useful Improvement in Warming-Ovens for Gas or Vapor Stoves, of which the following is a specification, reference being had therein to the accompanying drawings, forming a part thereof.

My invention relates to warming-closets for gas or vapor stoves.

The object of my invention is to provide a warming-closet which shall utilize the heat radiated downward from the burners of a gas or vapor stove for the purpose of warming food placed in a warming-chamber below the burners.

My invention provides a casing provided with means for supporting in its upper end one or more gas or vapor burners and having below the burners a warming-chamber in which are mounted vertically-adjustable pan or plate supporting members disposed one below each burner, the said supporting members being independently adjustable.

My invention provides, further, novel means by which the pan or plate supporting members are supported.

My invention provides, further, a lower chamber in the casing for the reception of pots, pans, &c.

My invention provides, further, a novel cover for the casing provided with holes in the bottom thereof corresponding in number to the number of burners used and disposed so as to aline, respectively, with said burners when the cover is in the closed position, the cover being hinged to the casing, so as to be swung, when desired, to an upright position, and thus furnish protection to the wall.

My invention provides, further, a cover for the casing having a peripheral encircling flange and a flange encircling each hole in the bottom of the cover, whereby when water or any liquid is spilled from a vessel disposed over a burner the liquid will remain outside the casing and not run into the burners.

Other novel features are hereinafter fully described and claimed.

In the accompanying drawings, illustrative of my invention, Figure 1 is a perspective view of a warming-closet constructed to utilize two gas or vapor burners, the cover being shown in the raised position. Fig. 2 is a front elevation view of the casing shown in Fig. 1, the cover being shown closed, the door to the upper chamber open, and the pan or plate supporting members adjusted to different vertical positions. Fig. 3 is a vertical sectional view taken on the dotted line *a b* of Fig. 2. Fig. 4 is a horizontal sectional view taken on the dotted line *c d* of Fig. 2. Fig. 5 is a plan view of the cover.

Similar characters of reference indicate similar parts.

1 indicates the casing, comprising, preferably, a rectangular sheet-metal box having an open upper end, in which is mounted an ordinary burner-frame 2, such as are commonly provided with portable gas or gasolene stoves. The frame 2 is supported in the upper end of the casing by lugs 3, provided one in each inner corner of the casing.

4 indicates the two burners of the ordinary pattern employing gas as a fuel.

Below the burners 4 in the front side of the casing 1 is a downwardly-opening hinged door 5, by which access to the upper part of the inside of the casing is attained. Below the door 5 is preferably provided a horizontal partition 6, which separates the casing into two chambers, the lower one being used for holding pots, pans, and similar articles and the upper chamber being used for warming food.

In the forward side of the casing 1 below the partition 6 are provided two doors 7, hinged to the casing.

A cover 8 is hinged at one edge to the rear upper end of the casing 1 and is provided with two holes 9 in the bottom which when the cover is closed or in the position shown in Fig. 3 are respectively alined with the two burners 4. The cover 8 is provided at its edges with a peripheral encircling flange 10, formed at one end into a lip 11 for discharging liquid deposited on the cover. The bottom of the cover is provided also around each hole 9 with an upwardly-extending flange 12, which prevents water or liquid spilled from a vessel placed over the burners from passing into the interior of the casing or into the burners, such spilled liquid passing off the cover by means of the lip 11.

Inside the upper chamber and below each burner I provide a vertically-movable pan or plate support 13, upon which may be placed a dish containing food that it is desired to have warmed. Each pan or plate supporting member 13 is provided at its rear end with a vertical hole therethrough, in which is fitted a vertical post 14, the lower end of which is secured to the partition 6 and the upper end of which is rearwardly turned and secured to the rear side of the casing in any convenient manner. There are as many posts 14 provided as there are burners, and the posts are disposed one in the rear of each burner, but in the same vertical plane as the burner. By so disposing the posts 14 they are not in the way when it is desired to lower both members 13 upon the partition 6 and place upon the said members a large dish containing, for instance, a large fowl, such as a turkey. The members 13 are independently adjustable to different heights, so that the food supported thereon may be placed as close as desirable to the burner immediately above. The members 13 being supported at their rear ends will cramp on their supporting-posts 14 when brought at rest after adjustment, and will thus remain in position; but by slightly raising their forward ends they may readily be raised or lowered. The posts 14 and the holes in the members 13, fitted thereto, are made, preferably, otherwise than round, so that the members 13 will not swing laterally.

It is obvious that my invention may be adapted to a stove having any number of burners, and its shape may be any convenient form. Any desired means may be employed for supporting the burner-frame 2, which may be of any kind such as ordinarily used.

Many modifications of my invention may be resorted to without departing from its spirit.

Having thus described my invention, what I claim, and desire to secure by Letters Patent, is—

1. A warming-closet comprising a casing provided with means for supporting in its upper part one or more gas or vapor burners, a warming-chamber below said burners provided with a lateral door, one or more vertical rods in said chamber and a vertically-adjustable pan or plate support mounted on each of said rods.

2. A warming-closet comprising a casing provided with means for supporting in its upper part one or more gas or vapor burners, the upper part of the casing forming a warming-chamber below the place reserved for the burners, said chamber having a lateral door, and a pan hinged to the casing and forming a cover for the upper end thereof, said pan being provided in its bottom with holes therethrough corresponding in number to the number of burners to be used and disposed so that when the pan-cover is swung to the closed position to register with the burners, each opening in the cover to be provided with an upwardly-extending flange encircling the same.

3. A warming-closet comprising a casing provided with means for supporting in its upper end one or more gas or vapor burners, a cover hinged to the upper end of the casing and provided with holes through the bottom thereof corresponding in number to the number of burners to be used and disposed so as to aline with the burners when the cover is in the closed position, the cover being provided with a peripheral encircling flange on its upper side and also with an upwardly-extending flange encircling each hole in the bottom, a transverse horizontal partition in the casing below the burner-supporting means, a lateral door in the casing above said partition, and a plurality of vertically-adjustable pan or plate supports in the casing above the partition and below and in line with the holes in the cover when the cover is in the closed position.

4. A warming-closet comprising a casing divided into an upper and a lower chamber each provided with a lateral door, the upper chamber being provided with means for supporting one or more gas or vapor burners, and a number of vertically and independently adjustable pan or plate supports corresponding in number to the number of burners to be used and disposed one below each burner.

5. In a warming-closet, the combination with a casing provided with a gas or vapor burner in its upper end and a warming-chamber below the said burners having a lateral door, of a vertically-adjustable plate or pan support disposed below said burner in said warming-chamber, and a cover hinged to the upper end of the casing and provided with a hole therethrough alining with the burner when the cover is in the closed position, the cover being provided with a flange on its upper side encircling the hole therethrough.

6. In a warming-closet, the combination with a casing provided with a gas or vapor burner in its upper end and a warming-chamber below the burner, a lateral door below the burner in the casing, a horizontal partition below the said lateral door, a vertical post having its lower end supported on said partition and disposed to the rear of and in the same vertical plane as the center of said burner, and a vertically-adjustable pan or plate support mounted on said post and disposed below said burner.

7. In a warming-closet, the combination with a casing provided with means for supporting in its upper end one or more gas or vapor burners, and having a lateral door, of vertical posts corresponding in number to the number of burners used mounted in said casing and disposed respectively in the same vertical planes as the burners one to the rear of each burner, and a pan or plate support vertically adjustable one on each of said posts and disposed respectively one below each burner.

8. In a warming-closet, the combination with a casing provided in its upper end with a gas or vapor burner, a lateral door below the said burner, and a horizontal partition below said door, of a vertical post supported by said partition to the rear of and below said burner, and a pan or plate supporting member slidably mounted on said post and extending therefrom under said burner.

9. In a warming-closet, the combination with a casing provided in its upper end with a gas or vapor burner, a lateral door below said burner, a horizontal partition below said door, a lateral door in the casing below said partition, a vertically-adjustable pan or plate support in the casing above the partition and disposed below the burner, and a cover hinged to the casing at the upper end thereof and provided with side flanges and a central hole disposed so as to aline with the burner when the cover is in the closed position.

10. A warming-closet comprising a casing provided with means for supporting in its upper end one or more burners, and having a warming-chamber below said burners and a lateral door for said chamber, and a cover hinged to the upper end of the casing and provided with a number of holes corresponding to the number of burners used, the cover being provided with flanged edges one of which is provided with a discharge-lip for liquid collected on the cover, and provided around each hole with an upwardly-extending encircling flange, the holes in the cover registering with the burners.

In testimony whereof I affix my signature in presence of two subscribing witnesses.

LUCY A. BURNHAM.

Witnesses:
WARREN D. HOUSE,
HENRY F. ROSE.